(12) United States Patent
Boeck et al.

(10) Patent No.: US 12,221,138 B2
(45) Date of Patent: Feb. 11, 2025

(54) CLIMATE CONTROL SYSTEM FOR A VEHICLE

(71) Applicant: Faiveley Transport Leipzig GmbH, Schkeuditz (DE)

(72) Inventors: Lutz Boeck, Schkeuditz (DE); Erik Hoffmann, Borsdorf (DE); Steffen Poser, Krostitz (DE); Kai Fischer, Leipzig (DE)

(73) Assignee: Faiveley Transport Leipzig GmbH, Sehkeuditz (DE)

( * ) Notice: Subject to any disclaimer, the term of this patent is extended or adjusted under 35 U.S.C. 154(b) by 405 days.

(21) Appl. No.: 17/600,399

(22) PCT Filed: Aug. 26, 2020

(86) PCT No.: PCT/DE2020/100717
§ 371 (c)(1),
(2) Date: Sep. 30, 2021

(87) PCT Pub. No.: WO2021/037308
PCT Pub. Date: Mar. 4, 2021

(65) Prior Publication Data
US 2022/0212698 A1    Jul. 7, 2022

(30) Foreign Application Priority Data
Aug. 27, 2019   (DE) .......................... 202019104696.1

(51) Int. Cl.
*B61D 27/00* (2006.01)
*B60H 1/00* (2006.01)
(Continued)

(52) U.S. Cl.
CPC ..... *B61D 27/0018* (2013.01); *B60H 1/00021* (2013.01); *B60H 1/3225* (2013.01);
(Continued)

(58) Field of Classification Search
CPC .............. B60H 1/00021; B60H 1/3225; B60H 2001/00114; B60H 2001/0015;
(Continued)

(56) References Cited

U.S. PATENT DOCUMENTS 11,007,547 B1 * 5/2021 Begis ...................... B05B 16/80
11,310,944 B2 * 4/2022 Martini ................ F24F 11/0001
(Continued)

FOREIGN PATENT DOCUMENTS

| AT | 404009 B | * | 6/1998 | ......... B61D 27/0018 |
| CA | 3136515 A1 | * | 3/2021 | ......... B61D 27/0018 |

(Continued)

OTHER PUBLICATIONS

First Examination Report for corresponding AU Application No. 2020336808 dated Jan. 31, 2023 (4 pages).
(Continued)

*Primary Examiner* — Ljiljana V. Ciric
(74) *Attorney, Agent, or Firm* — K&L Gates LLP

(57) ABSTRACT

A climate control system for a vehicle for combustible coolants and is a device for installation on a vehicle roof. A directly evaporating system includes an electrical switch box inside a climate control device for the vehicle and is partitioned so that, in the event of relevant leakages of assemblies containing coolant, the assembly cannot come into contact with the combustible coolant and no ignitable mixture can occur in these areas. The electrical box is a closed assembly and is operatively connected to an assembly by which air from areas outside the segments containing coolant is guided into the electrical box.

5 Claims, 3 Drawing Sheets

(51) Int. Cl.
    *B60H 1/32*       (2006.01)
    *F24F 11/36*     (2018.01)
    *F25B 9/00*       (2006.01)

(52) U.S. Cl.
    CPC .............. *F24F 11/36* (2018.01); *F25B 9/002* (2013.01); *B60H 2001/00114* (2013.01); *B60H 2001/0015* (2013.01); *Y02T 30/00* (2013.01)

(58) Field of Classification Search
    CPC ... B60H 1/3229; B61D 27/0018; F24F 11/36; F25B 9/002; Y02T 30/00
    See application file for complete search history.

(56) References Cited

U.S. PATENT DOCUMENTS

| | | | | |
|---|---|---|---|---|
| 11,492,711 | B2 * | 11/2022 | Ballantine | ............... C25B 15/08 |
| 2016/0105996 | A1 | 4/2016 | Schanzenbach et al. | |
| 2019/0381866 | A1 | 12/2019 | Kuebeck et al. | |
| 2021/0229126 | A1 * | 7/2021 | Begis | ..................... B05B 16/60 |
| 2022/0177013 | A1 * | 6/2022 | Boeck | ............... B61D 27/0018 |
| 2022/0212698 | A1 * | 7/2022 | Boeck | ............... B60H 1/00021 |

FOREIGN PATENT DOCUMENTS

| | | | | | |
|---|---|---|---|---|---|
| DE | | 4405377 | A1 | | 9/1994 |
| DE | | 19824461 | A1 | | 12/1999 |
| DE | | 102009056968 | B3 | | 3/2011 |
| DE | | 102019124531 | A1 | * | 3/2021 |
| DE | | 102020120615 | A1 | * | 2/2022 ............. F23D 14/82 |
| EP | | 1010599 | A1 | | 6/2000 |
| EP | | 2755878 | B1 | * | 8/2018 ......... B60H 1/00371 |
| IL | | 287235 | A | * | 12/2021 ......... B61D 27/0018 |
| JP | | 2012136159 | A | | 7/2012 |
| WO | WO-2013037335 | A1 | | * | 3/2013 ......... B60H 1/00371 |

OTHER PUBLICATIONS

Office Action for corresponding JP Application No. 2021-562020 dated Dec. 28, 2022 (5 pages).
Requisition by the Examiner for corresponding CA Application No. 3,137,440 dated Jan. 27, 2023 (3 pages).
International Preliminary Report on Patentability mailed Mar. 10, 2022 for priority application PCT/DE2020/100717 (7 pages).
English translation of the International Preliminary Report on Patentability mailed Mar. 10, 2022 for priority application PCT/DE2020/100717 (8 pages).
Office Action for corresponding JP Application No. 2021-562020 dated Oct. 3, 2022 (5 pages).
Office Actionfor corresponding KR Application No. 10-2021-7037220 dated Nov. 20, 2023 (3 pages).
International Search Report and Written Opinion for corresponding application No. PCT/DE2020/100717 (9 pages).
English translation of the International Search Report for corresponding application No. PCT/DE2020/100717 (2 pages).

* cited by examiner

CLIMATE CONTROL SYSTEM FOR A VEHICLE

CROSS-REFERENCE TO RELATED APPLICATIONS

This application claims priority to International Patent Application No. PCT/DE2020/100717 (filed 26 Aug. 2020), which claims priority to German Patent Application No. 20 2019 104 696.1 (filed 27 Aug. 2019). The entire disclosures of these applications are incorporated herein by reference.

BACKGROUND

Technical Field

The invention relates to a climate control system for a rail vehicle, the climate control system being suitable for combustible coolants and being designed as a compact device for installation on the vehicle roof and having at least equipment sections for air treatment, a compressor-liquefier unit and an electrical switch box (electrical box) and optionally equipment sections for outgoing air and/or silencers.

State of Art

Various coolants are known for climate control systems in vehicles, where the use of synthetic coolants is problematic from an ecological point of view. For this reason, the coolant R134a has been used very extensively for motor vehicles and for rail vehicles. However, this coolant acts as a greenhouse gas when the coolant escapes into the atmosphere. Therefore, the use of coolant R134a for new passenger cars in the European Union was terminated on Jan. 1, 2017.

As an alternative to R134a, coolant R1234yf is now predominantly used, which has a much lower greenhouse effect, but is combustible and classified as an A2L coolant. However, even the use of this coolant is now being criticized by experts. For example, highly toxic hydrofluoric acid (HF) is formed when released in conjunction with temperatures >250° C., and persistent trifluoroacetic acid (TFA) is formed in the atmosphere as a degradation product, which accumulates in water. Due to the associated risks, the use of HFO coolants such as R1234yf is also being abandoned as a matter of principle.

An alternative to this is the use of carbon dioxide (R744) as a natural coolant. However, the use of R744 results in relatively complex equipment technology due to the required high system pressures compared to other coolants. Moreover, at high ambient temperatures, there is a significant deterioration in the coefficient of performance (COP) and therefore a significant increase in energy demand for climate control. In addition, there is a sharp reduction in refrigeration capacity as ambient temperatures rise, which can be countered by appropriately larger component sizing.

It is thus evident that the coolants used to date ultimately represent a compromise between different functional, environmental and safety requirements. There is a need for the use of coolants for vehicle climate control systems, also for rail vehicles, which are ecologically uncritical when emitted to the atmosphere, exhibit high energy efficiency over the entire operating range and can continue to utilize the knowledge and experience of the cold vapor technology used to date. In the case of rail vehicles, these units are mainly designed as compact units for the vehicle roof.

Regardless of their specific design, such compact climate control units typically comprise the air treatment and compressor-liquefier unit sections and can optionally include outgoing air equipment, electrical switch box and/or silencer sections.

As a solution to the requirements described above, combustible hydrocarbons such as propane (R290), propylene (R1270), or isobutane (R600a) are of interest as alternative coolants. These coolants are widely used in direct expansion systems with limited charge quantities (<150 g or <500 g), in stationary applications. If larger charge quantities are required to generate higher cooling capacities, indirect systems are preferred due to the flammability of these direct expansion systems.

For climate control of rail vehicles, combustible coolants have, to date hardly been used—neither as a direct nor as an indirect evaporating system, this due to the explosion and fire dangers associated with the coolants. The above-mentioned risk is reduced in an indirect evaporating system, by designing the climate control system with secondary circuit systems. In this case, the required cooling (or heating) power is provided in a primary circuit using combustible coolants in conventional compression refrigeration circuits, which primary circuit is located outside the vehicle and thus has no direct connection to the vehicle interior. This cooling power is transferred by heat exchangers (preferably plate heat exchangers) to a secondary circuit, which is designed, for example, as a brine circuit with water-glycol mixtures.

A technical solution of this type is known from WO 2018/137 908 A1. According to this document, a rail vehicle has a primary coolant circuit that is arranged outside the vehicle and is structurally completely separated from the passenger compartment. A secondary coolant circuit is arranged at least partially inside the rail vehicle. Heat exchange between the primary coolant circuit and the secondary coolant circuit takes place via an intermediate heat exchanger arranged under the floor in the exterior area. As a result, the primary coolant circuit is routed completely outside the interior of the rail vehicle. This design means that when using combustible substances, the safety considerations to be considered substantially involve the outside area, whereas the interior area can be assumed to be as secure as conventional systems. This means that it is also possible to use coolants which, for safety-related reasons, have hardly been used to date for the climate control of passenger compartments. For this reason, WO 2018/137 908 A1 proposes the use of combustible coolants such as propane, which is well suited as a coolant from a functional point of view but has hardly been used to date due to the problems of fire and explosion dangers elucidated above.

Considering the state of the art according to WO 2018/137 908 A1 and similar proposed solutions, it can be expected that the acceptance of using combustible coolants in climate control systems for rail vehicles will greatly increase in the medium term. It is however to be noted that the indirect circuit will still result in energy use disadvantages due to thermal losses in the intermediate heat exchanger, as well as additional weight and the need for additional installation space. Therefore, for the extensive use of combustible coolants, there are aspirations for a direct evaporating system, a system which avoids these disadvantages. To be able to guarantee fire and explosion protection with a high level of safety, including in the event of possible operational malfunctions, further structural measures may therefore eventually be necessary on the climate control systems of rail vehicles, which lead to specific designs of various assemblies.

One sensitive assembly in this respect is the electrical switch box (electrical box) in a compact climate control unit.

Such an electrical box is usually designed as a separate area in the climate control unit with interfaces and it accommodates all the components required for controlling or monitoring the climate control unit. To avoid hazards, it is necessary, especially when combustible coolants are used, that no ignitable mixture is allowed to enter the electrical box. This can basically be prevented by building up an overpressure in the interior. DE 10 2014 101 184 A1 relates to an electrical switch box in which fans are used to generate an overpressure in the interior to prevent harmful particles and the like from flowing in. This design is, however, not suitable for combustible coolants. Similarly, if combustible coolants are used, it is not acceptable for the air required for the overpressure to be extracted from the immediate external environment of the climate control system, as the risk of contamination is very high here. Alternatively, a very high-volume flow could then be supplied to achieve a corresponding dilution of the possibly contaminated air. This does, however, have the disadvantage that a substantially higher fan power is required and that the very high-volume flow can result in additional contamination, which in turn requires additional filtration.

BRIEF SUMMARY

It is therefore the task of the invention, to implement a directly evaporating system, in which the electrical switch box (electrical box), within a compact climate control unit for a rail vehicle, is closed off in such a way that this assembly cannot come into contact with the combustible coolant in the event of relevant leaks from the coolant-carrying assemblies, and thus no ignitable mixture can occur in these areas. Specifically, the aim is to prevent combustible coolant from flowing into the electrical box following leakage.

This object is achieved in that the electrical switch box/electrical box is operatively connected to an assembly by which air from areas outside of the coolant-carrying segments or from the outer area of the climate control system is guided into the electrical box in such a way that an overpressure can be created in an electrical box which is sufficiently closed for this purpose, to prevent an accumulation of combustible coolant. This assembly for feeding air into the electrical box is designed as a separate fan, by means of which air is drawn in from the surroundings of the climate control system and thus an overpressure can be created in the electrical box. Alternatively, this assembly for supplying air is designed as a ducting structure which, starting from the overpressure area of the supply air section of the air handling unit of the climate control system, guides a partial volume flow of the supply air into the electrical box. In a further alternative, this assembly for supplying air is designed as a ducting structure which, starting from an overpressure connection of an outgoing air duct of the climate control system equipped with an outgoing air fan, guides a partial volume flow of the outgoing air into the electrical box.

Independently of the specific design, the assembly for supplying air from areas outside of the coolant-carrying segments or from the outer area of the climate control system into the electrical box, is designed in such a way that an overpressure can be created in the electrical box. To achieve this, the electrical box is designed as a sufficiently closed assembly. Alternatively, the electrical box can be designed with a free or ducted exhaust air ducting all the way to the air discharge opening for targeted venting and/or heat dissipation of the electrical components installed in the electrical box.

Consequently, the novelty compared to the known prior art consists in the electrical box being designed as a closed box. Therefore, no contamination with an ignitable mixture can occur during standstill. The fan in the climate control unit or alternatively vehicle, which is in any case present, takes on an additional function as a supply air fan or alternatively an outgoing air fan. Moreover, if required, a separate fan can also be integrated into the design. The extraction of the air occurs from an area in the climate control unit or alternatively vehicle with an atmosphere that is not potentially ignitable, this by drawing the air from areas without coolant-carrying parts. The ducting of air to the electrical box is provided by a separate duct or duct section and the ventilation of the electrical box ensures at least a slight overpressure to the environment.

The technical solution, according to the invention, increases the acceptance of the use of combustible coolants in climate control systems for rail vehicles. This, since it is now possible to significantly improve fire and explosion protection at the electrical switch box (electrical box), an assembly that is sensitive in this respect, this even in the event of an escape of combustible coolant in the areas neighboring the compact climate control system. With the permanent generation of an overpressure in the electrical box, an inflow of combustible coolants is thus effectively prevented.

DESCRIPTION OF THE DRAWINGS

In the following, an embodiment example of the invention is explained in more detail with reference to the drawings.

Figure 1:
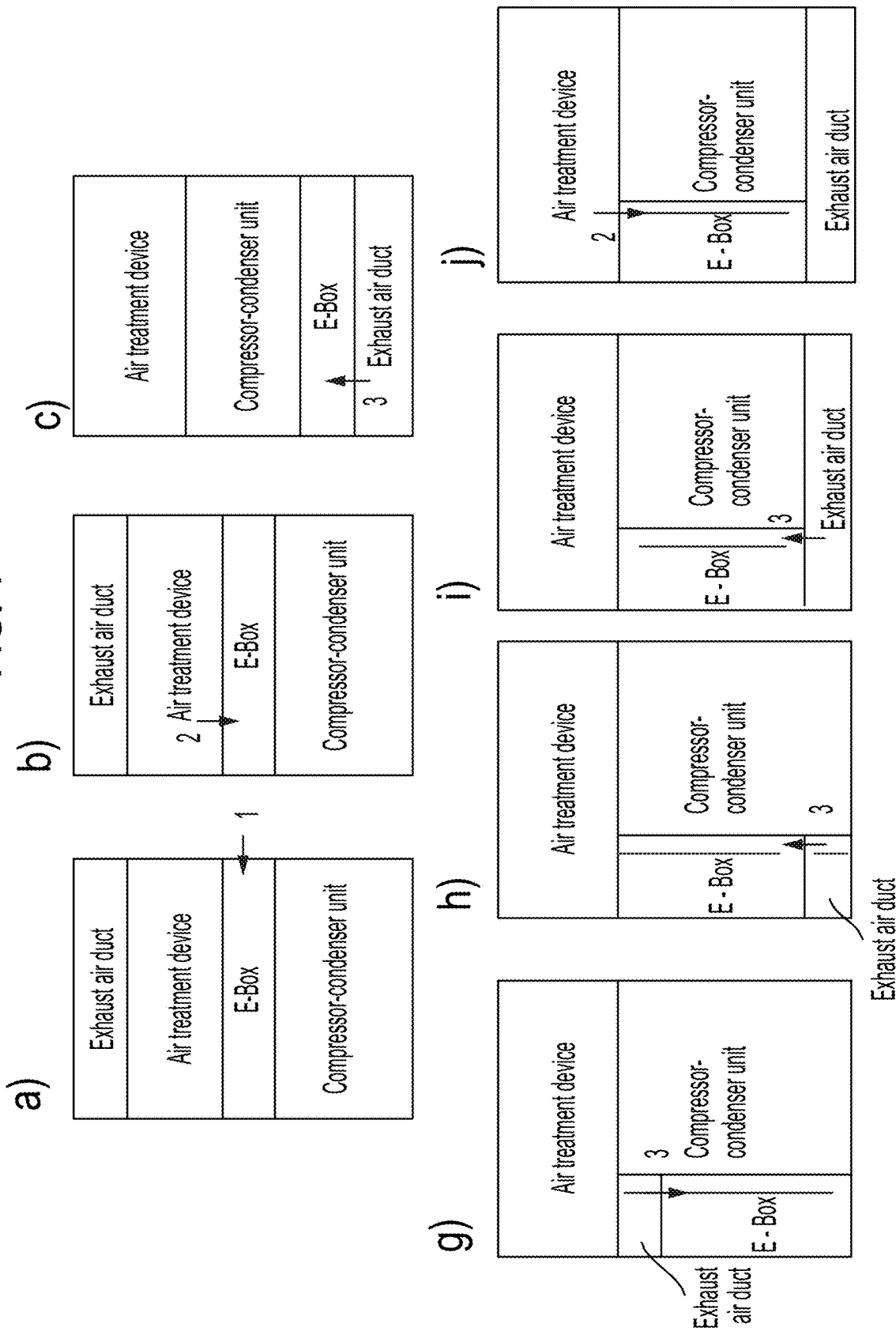
FIG. 1 shows a stylized representation of a compact climate control unit for a rail vehicle in a top view with different variants for the arrangement of the sections and their assignment to the electrical box.

The climate control system for a rail vehicle shown in the drawing is designed as a compact device for installation on the vehicle roof and is preferably intended for operation with combustible coolants of categories A2, A2L and A3, for example R290. Assemblies are provided with which an overpressure can be created in the electrical switch box/electrical box to prevent an inflow of the combustible coolant into the electrical box. The corresponding intake of the air required to build up a defined overpressure from areas outside the coolant-carrying segments or from the outer area ensures that no accumulation of combustible coolant can take place in the electrical box until an ignitable mixture is reached.

FIG. 1 shows a top view of such a compact climate control unit with different variants for arranging the sections of the climate control unit and their assignment to the electrical box.

Image 1*a*) shows the creation of overpressure by aspiration of ambient air with the aid of a separate fan, which is used exclusively to create overpressure in the electrical box.

Image 1*b*) shows the creation of overpressure by ducting from the air handling unit to the electrical box. In this case, conditioned air or mixed air is taken from the overpressure area upstream of the electric heater of the air treatment unit and fed to the electrical box via a duct.

Image 1c) shows the creation of overpressure by ducting from the outgoing air duct to the electrical box. Here, the outgoing air fan creates an overpressure in the electrical box.

Images 1g) to 1j) show further variants for the creation of overpressure, wherein the individual sections of the climate control system are alternatively arranged.

Figure 2:
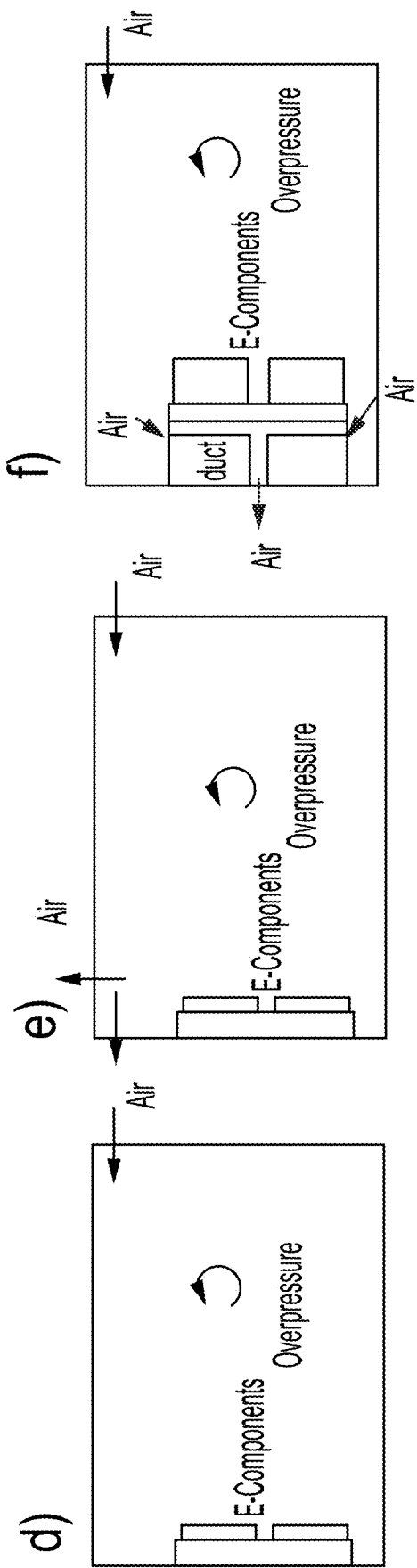
FIG. 2 shows a stylized representation of an electrical box with overpressure in the interior and different flow variants.

FIG. 2 shows an electrical box with overpressure in the interior and different variants for the outflow of the air.

Image 2d) shows a tightly built electrical box without a focused outflow. This means that there is no overflow from heat sources and thus no heat dissipation of the electrical components. The overpressure is built up by one of the variants explained above until a constant overpressure is achieved within the limits of the attained pressure tightness.

Image 2e) shows moderate rates of air leakage in the electrical box, but no focused outflow. The buildup of overpressure and its maintenance are accomplished by inflow of air by means of one of the variants explained above. Outflow through gaps and leaks in non-pressure-tight segments of the air handling unit is possible. There is however no significant outflow, amongst others, into the air handling unit, this to prevent ozone contamination of the supply air. The air exchange in the electrical box causes an undirected heat dissipation.

Image 2f) shows a ducted outflow from the electrical box and a focused heat dissipation of electrical components. The build-up of overpressure and its maintenance are also carried out here by inflowing process air by means of one of the variants explained above. The air exchange in the electrical box thus additionally causes a heat dissipation of the electrical components. Here, for example, the ducted discharge to the discharge opening, along electrical components to be cooled, results in targeted heat dissipation.

Figure 3:
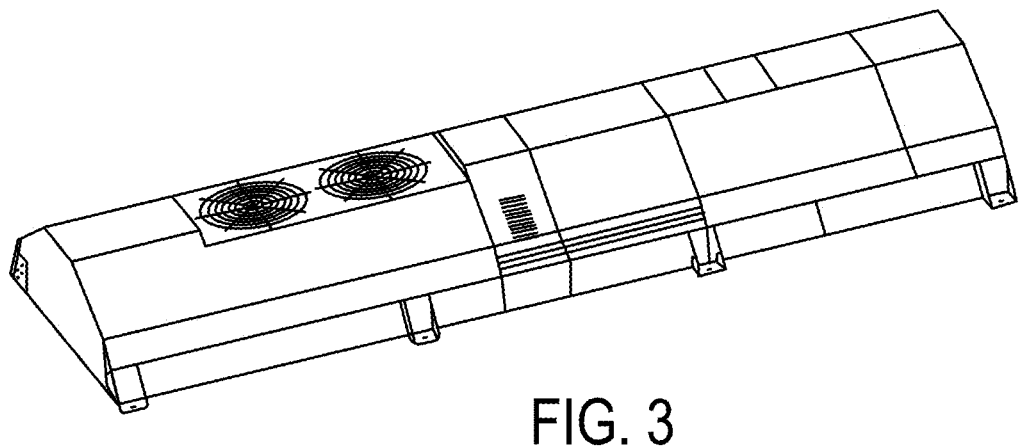
FIG. 3 shows a stylized representation of the basic arrangement of an electrical box as a segment of a compact climate control unit.

FIG. 3 shows the arrangement of an electrical box as a segment of a compact climate control unit. Here, the creation of overpressure is, for example, achieved by a fan, the air inlet grille of which is stylized by several lines running parallel to each other and in a rectangular contour.

Figure 4:
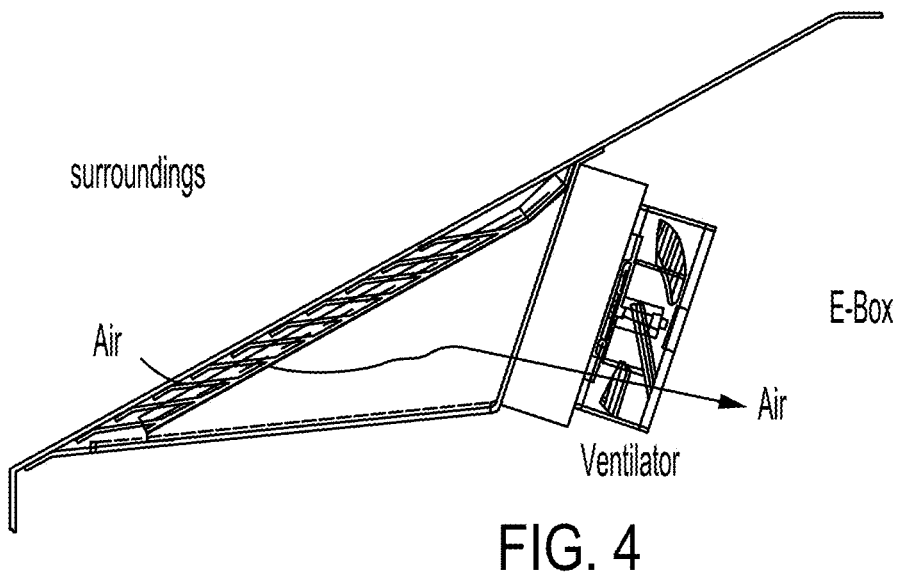
FIG. 4 shows a stylized representation of a supplementary view of the variant according to FIG. 3.

This basic design can be seen again in detail in FIG. 4, wherein the course of the air flow is also shown. Here, overpressure is created for the interior of the electrical box by aspiration of ambient air with the aid of a separate fan. This ambient air is aspirated by the fan via a specially designed weather protection plate. Optionally, there is an air filter in front of the fan for cleaning the ambient air.

Figure 5:
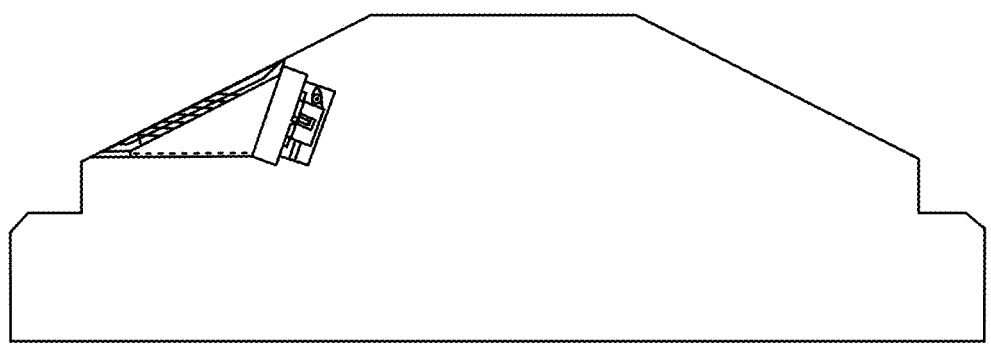
FIG. 5 shows a stylized representation of a further supplementary view of the variant according to FIG. 3.

FIG. 5 shows further details, in particular the fan in the electrical box with the interface to the environment.

What is claimed is:

1. A climate control system for a vehicle, the climate control system configured for using one or more combustible coolants and for installation on a vehicle roof, the climate control system comprising:
    an air treatment unit;
    a compressor unit; and
    an electrical switch box designed as a closed assembly and is operatively connected to an air supply assembly by which air from areas outside coolant-carrying segments of the climate control system is guided into the electrical switch box in such a way that an overpressure is created in the electrical switch box to prevent the one or more combustible coolants from flowing into the electrical switch box.

2. The climate control system according to claim 1, wherein the air supply assembly includes a separate fan configured to create the overpressure in the electrical switch box.

3. The climate control system according to claim 1, wherein the air supply assembly includes a duct structure which feeds a partial volume flow of the air into the electrical switch box from an overpressure area of a supply air section of the air treatment unit.

4. The climate control system according to claim 1, further comprising:
    an outgoing air fan, wherein the air supply assembly includes a duct structure which, guides a partial volume flow of outgoing air from outgoing air fan into the electrical switch box from an outgoing air duct.

5. The climate control system according to claim 1, wherein the electrical switch box is designed as a closed assembly with an opening for one or both of venting or cooling electrical components installed in an interior of the electrical switch box.

* * * * *